(12) United States Patent
Wang

(10) Patent No.: US 6,431,211 B1
(45) Date of Patent: Aug. 13, 2002

(54) WATER CONTROLLING STEM STRUCTURE OF A FAUCET

(76) Inventor: Shih-Ming Wang, No. 110, Hsiao-Yang Road, Chang Hua City (TW)

( * ) Notice: Subject to any disclaimer, the term of this patent is extended or adjusted under 35 U.S.C. 154(b) by 0 days.

(21) Appl. No.: 09/871,307

(22) Filed: Jun. 1, 2001

(51) Int. Cl.[7] ............................................. F16K 11/074
(52) U.S. Cl. ................................................. 137/625.31
(58) Field of Search ................................... 137/625.31

(56) References Cited

U.S. PATENT DOCUMENTS

| | | | | |
|---|---|---|---|---|
| 3,698,418 A | * | 10/1972 | Schmitt ........................ | 137/315 |
| 3,831,621 A | * | 8/1974 | Anthony et al. ............. | 137/270 |
| 4,425,935 A | * | 1/1984 | Gonzalez ..................... | 137/315 |
| 4,751,943 A | * | 6/1988 | Chi .......................... | 137/625.31 |
| 4,915,352 A | * | 4/1990 | Hochstrasser ............... | 251/175 |
| 4,924,903 A | * | 5/1990 | Orlandi ...................... | 137/454.5 |
| 5,107,884 A | * | 4/1992 | Orlandi ...................... | 137/454.5 |
| 5,732,734 A | * | 3/1998 | Buccicone ................... | 137/454.6 |
| 6,202,695 B1 | * | 3/2001 | Wu ........................... | 137/625.3 |
| 6,247,496 B1 | * | 6/2001 | Ko ............................ | 137/625.31 |

* cited by examiner

*Primary Examiner*—John Fox
(74) *Attorney, Agent, or Firm*—Harrison & Egbert

(57) ABSTRACT

A faucet is provided with a water controlling stem structure including a housing, a water control stem, a retaining piece, a water resisting block, a water distributing block, a water admitting member, a water discharging ring, and a spring. The water admitting member is provided with a water stopping edge, a through hole, a locating block, and a locating portion. The water admitting member is disposed in the bottom end of the housing such that the water stopping edge and the locating block of the water admitting member are joined with the water distributing block, and such that the through hole of the water admitting member is aligned with the center through hole of the water discharging ring.

4 Claims, 5 Drawing Sheets

WATER CONTROLLING STEM STRUCTURE OF A FAUCET

BACKGROUND OF THE INVENTION

1. Field of the Invention

The present invention relates generally to a faucet, and more particularly to a water controlling stem structure of the faucet.

2. Description of Related Art

As shown in FIG. 1, a prior art water controlling stem structure comprises a stem member 10, a water flow control member 11, a water admitting ring 12, and a spring 13, which are disposed in a faucet main body 14. The water flow control member 11 is provided with an oval through hole, whereas the water admitting ring 12 is provided with a center through hole. When the oval through hole of the water flow control member 11 is aligned with the center through hole of the water admitting ring 12, the water is let out of the faucet via the stem member 10. There is often a lack of firm contact between the stem member 10 and the water flow control member 11, thereby resulting in the problem of controlling the water flow with precision.

As shown in FIG. 2, another prior art water controlling stem structure comprises a housing 20, a water resisting block 22, a water distributing block 23, a water admitting block 24, and a washer 25. The housing 20 is provided with a water discharging hole 201 and a water control stem 21. The water distributing block 23 is provided with a water admitting hole 231. The water admitting block 24 is provided with a water hole 241 and an eccentric pillar 242. The water resisting block 22, the water distributing block 23 and the water admitting block 24 are disposed in the interior of the housing 20. The washer 25 is fitted over the eccentric pillar 242, which is fitted into a faucet main body 14. When the water control stem 21 is turned, the water is let out of the faucet via the eccentric pillar 242, the water distributing block 23, and the water discharging hole 201 of the housing 20. The water flow cannot be precisely controlled because the water hole 241 of the water admitting block 24 is aligned with the water admitting hole 231 of the water distributing block 23, and because the water admitting block 24 and the water distributing block 23 are in intimate contact with each other. The water admitting block 24 has the eccentric pillar 242 which contributes to the high cost of the production of the prior art water controlling stem structure.

BRIEF SUMMARY OF THE INVENTION

The primary objective of the present invention is to provide a faucet with a water controlling stem structure which is free of the deficiencies of the prior art water controlling stem structures described above.

The features and the advantages of the present invention will be readily understood upon a thoughtful deliberation of the following detailed description of the present invention with reference to the accompanying drawings.

DETAILED DESCRIPTION OF THE INVENTION

Figure 1:
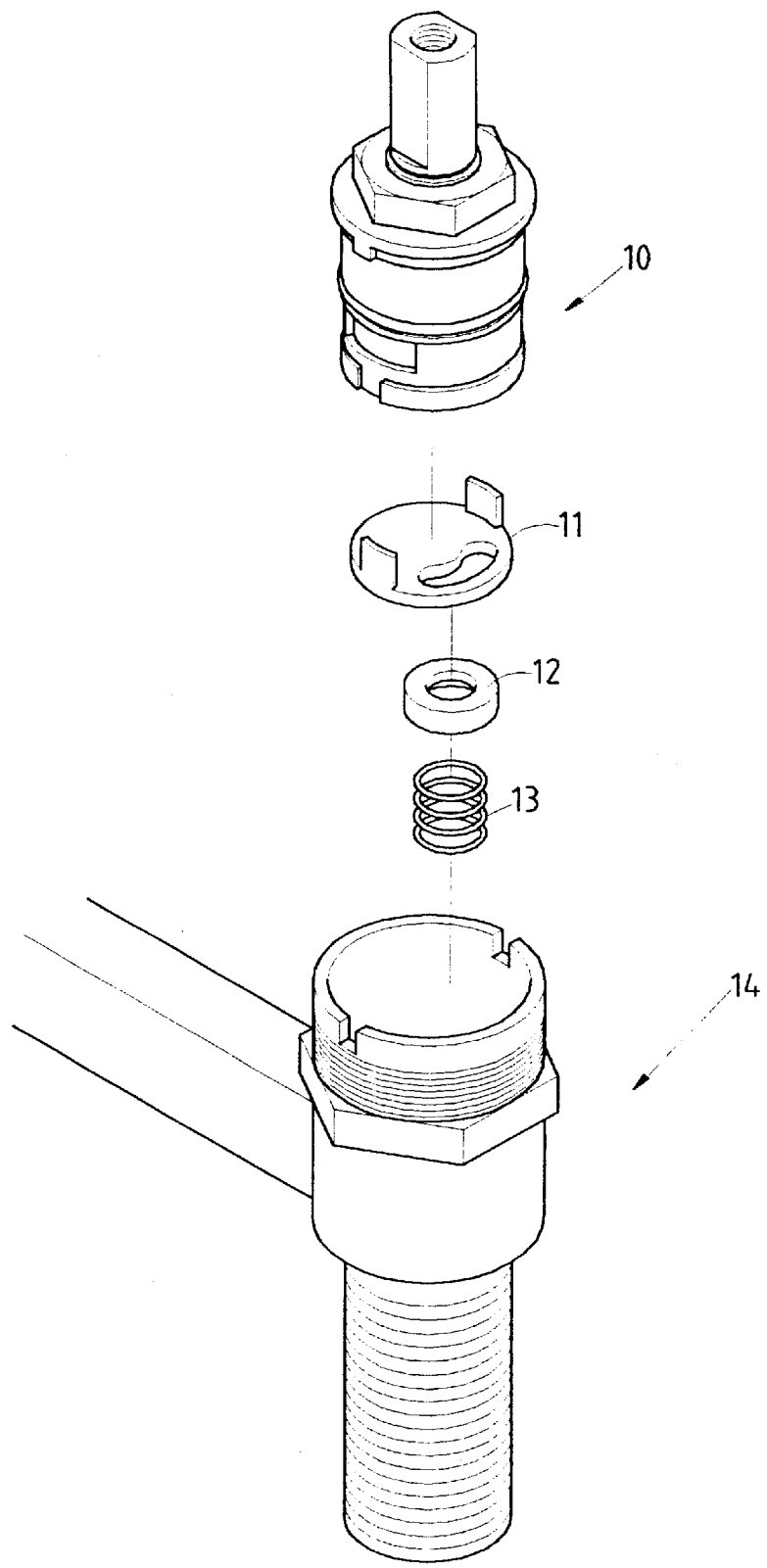
FIG. 1 shows an exploded view of a prior art water controlling stem structure.
Figure 2:
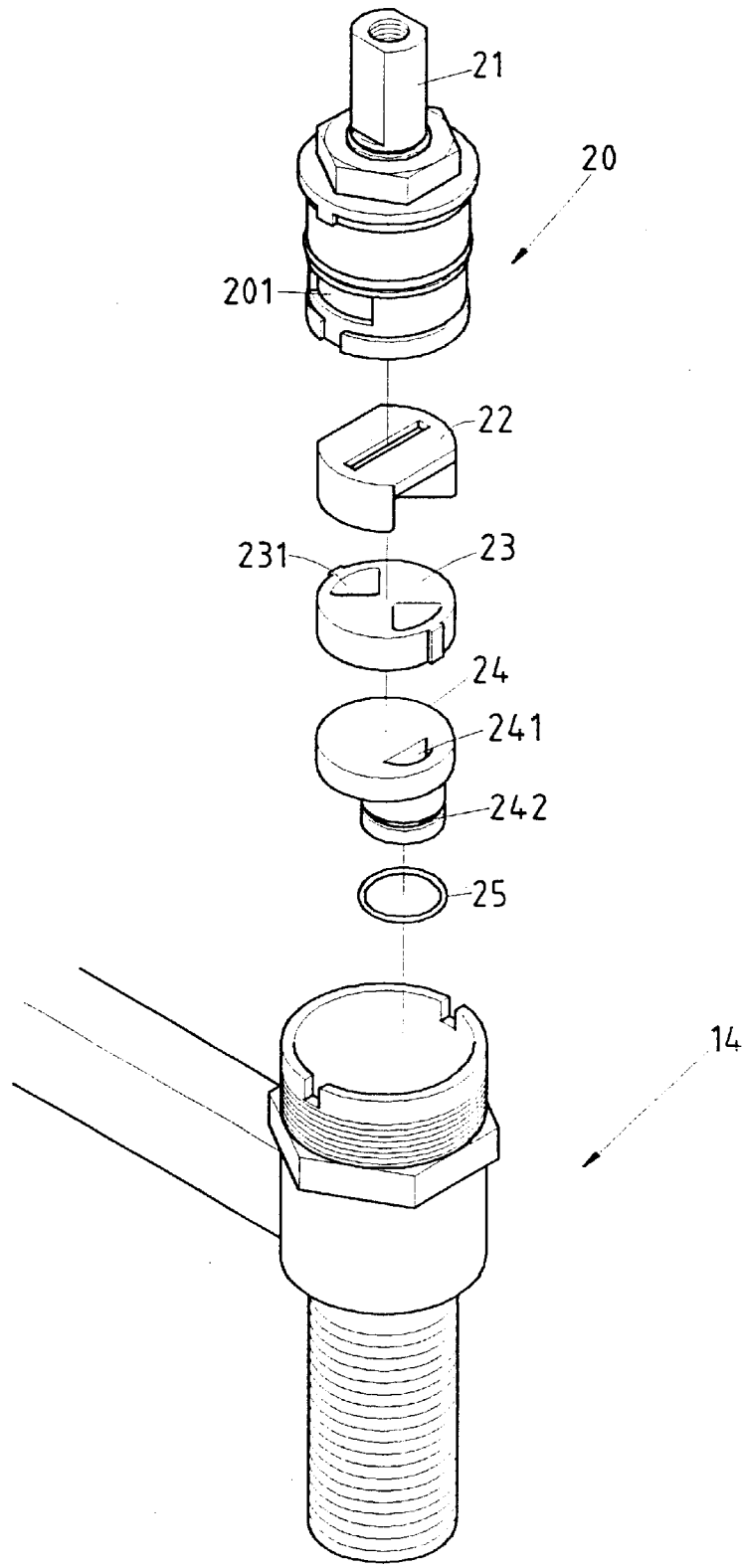
FIG. 2 shows an exploded view of another prior art water controlling stem structure.
Figure 3:
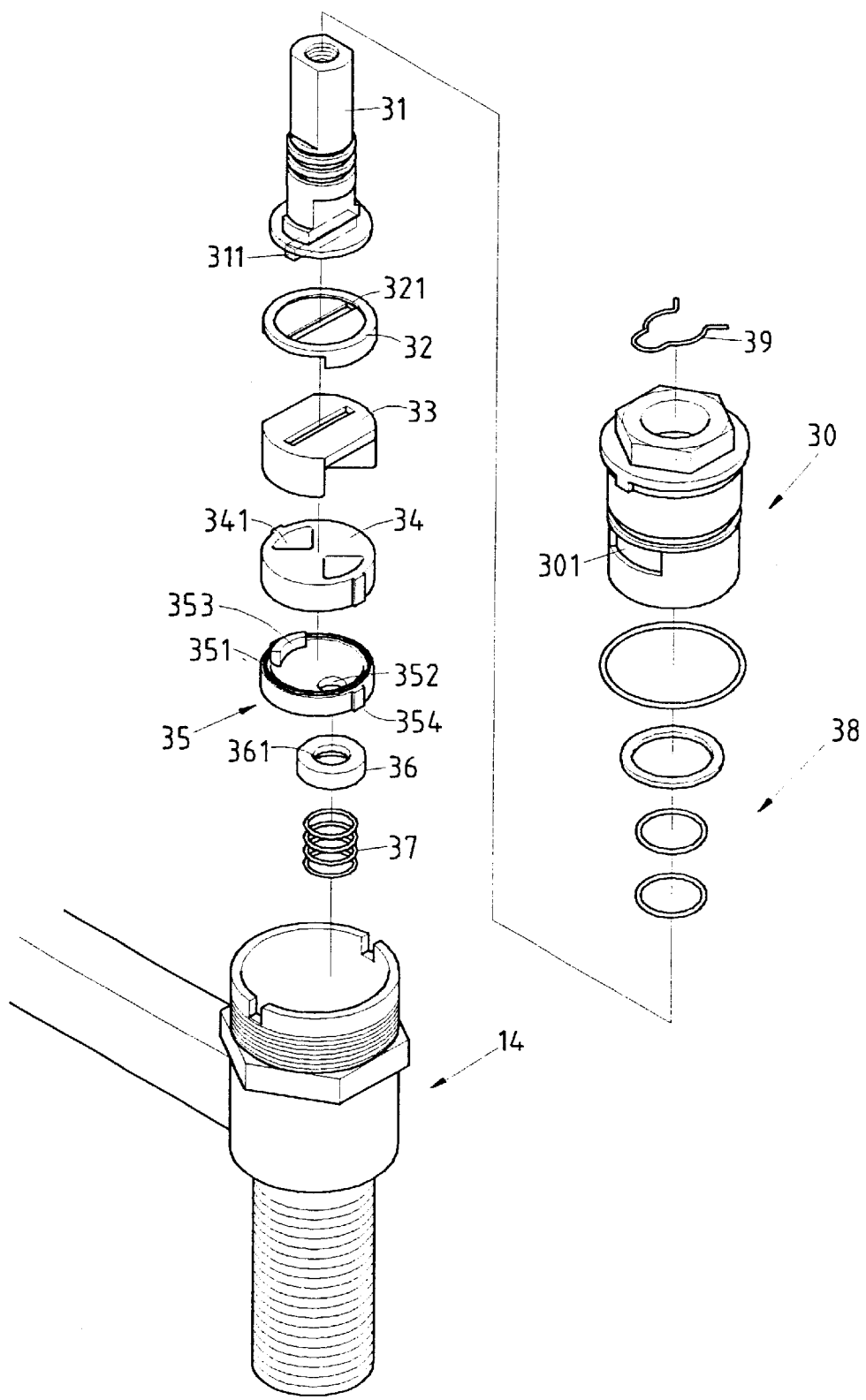
FIG. 3 shows an exploded view of the present invention.
Figure 4:
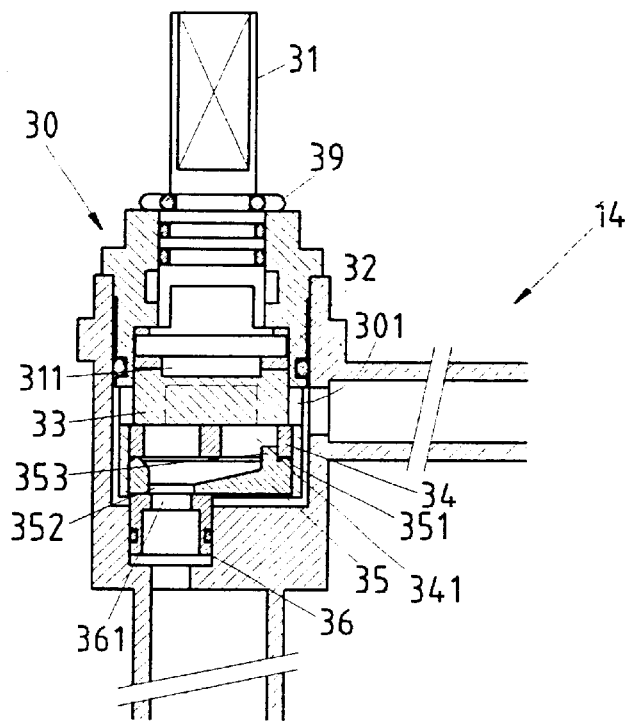
FIG. 4 shows a longitudinal sectional view of the present invention.
Figure 5:
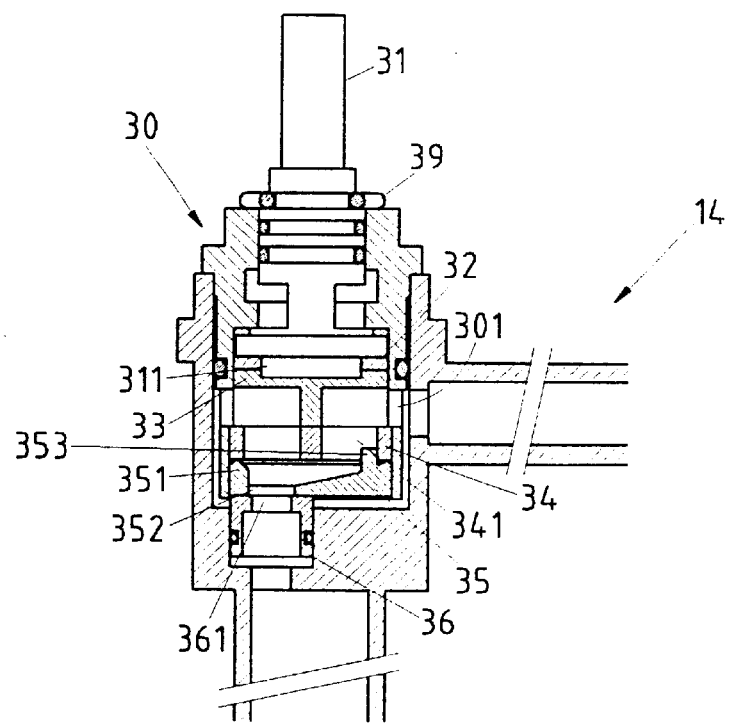
FIG. 5 shows another longitudinal sectional view of the present invention.
Figure 6:
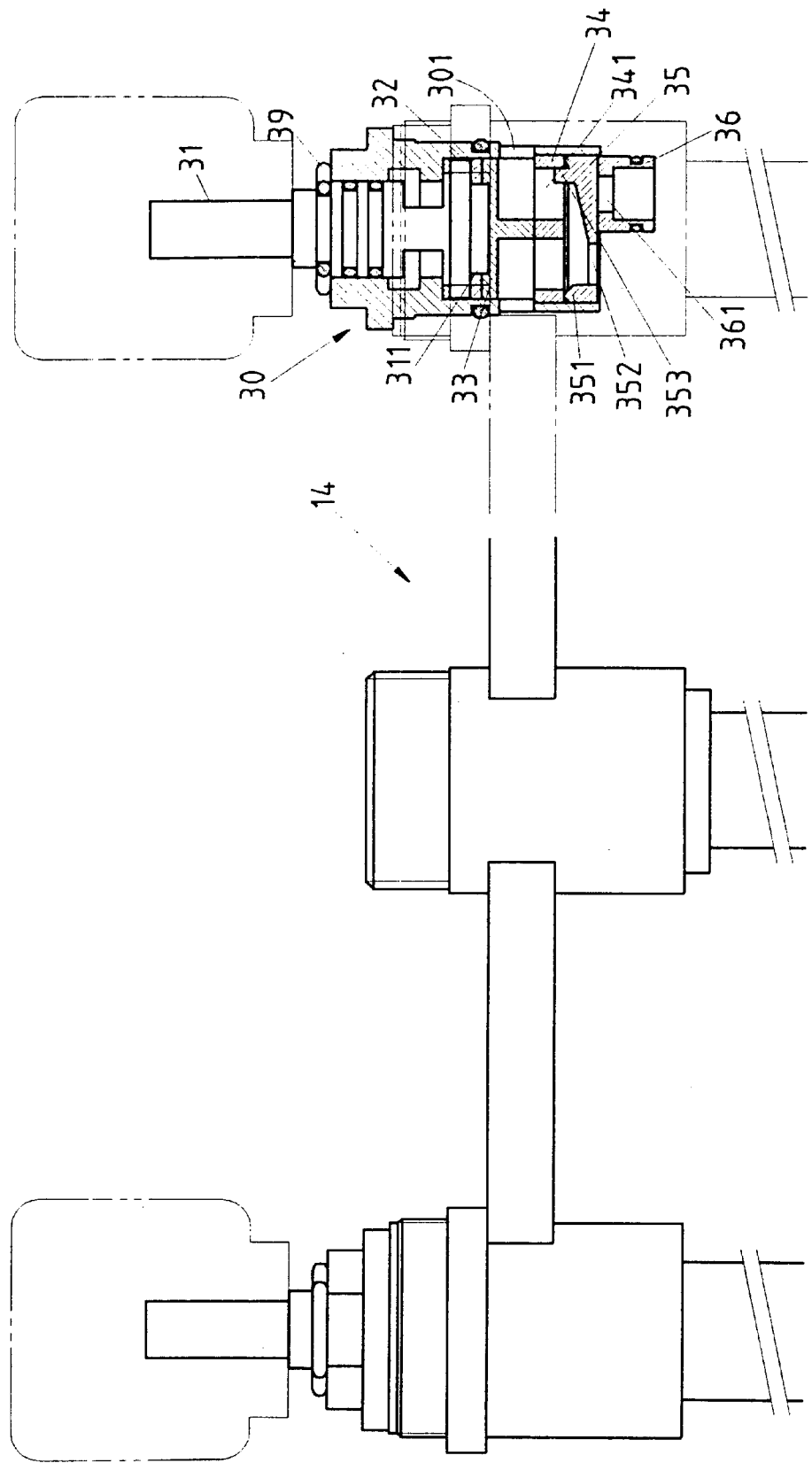
FIG. 6 shows a schematic view of the present invention in use.

As shown in FIGS. 3–6, a water controlling stem structure of the present invention comprises a housing 30 which is provided with two water discharging holes 301 and a water control stem 31. The water control stem 31 is held securely by a locating clamp 39 and is provided with a locating block 311. Located under the water control stem 31 is a retaining piece 32 for retaining a water resisting block 33. The retaining piece 32 is provided with a formed hole 321. The water resisting block 33 is in contact with a water distributing block 34 which is provided with a plurality of water admitting holes 341. A water admitting member 35 is located under the water distributing block 34. Located under the water admitting member 35 are a water discharging ring 36 and a spring 37. The water controlling stem structure is disposed in a faucet main body 14, in conjunction with a plurality of washers 38. The water discharging ring 36 is provided with a center through hole 361.

The present invention is characterized by the water admitting member 35 which is provided with a water stopping edge 351, a through hole 352, a locating block 353, and a locating portion 354. The water admitting member 35 is disposed at the bottom of the housing 30 such that the locating portion 354 is located by an auxiliary locating member (not shown in the drawing) of the housing 30. The auxiliary locating member may be either a protrusion or a slot. The locating portion 354 may be a slot or a protrusion. The water stopping edge 351 and the locating block 353 of the water admitting member 35 are joined with the water distributing block 34. The through hole 352 of the water admitting member 35 is aligned with the center through hole 361 of the water discharging ring 36.

The water control stem 31 is provided at the top end with a handle. As the handle is turned to open up the faucet, water flows into the faucet main body 14 such that the water is let out of the water discharging hole 301 of the housing 30 via the center through hole 361 of the water discharging ring 36, the through hole 352 of the water admitting member 35, and the water admitting holes 341 of the water distributing block 34.

As the water control stem 31 is turned by the handle, the locating block 311 of the water control stem 31 actuates the retaining piece 32 and the water resisting block 33, thereby resulting in the alignment of the water discharging hole 301 of the housing 30 with the water admitting hole 341 of the water distributing block 34.

The present invention described above is to be regarded in all respects as being merely illustrative and not restrictive. Accordingly, the present invention may be embodied in other specific forms without deviating from the spirit thereof. The present invention is therefore to be limited only by the scope of the following claims.

I claim:

1. A water controlling stem structure of a faucet comprising a housing which is comprised of two water discharging holes, a water control stem, a locating clamp for locating said water control stem, a retaining piece located under said water control stem, a water resisting block retained by said retaining piece, a water distributing block in contact with said water resisting block, a water admitting member disposed under said water distributing block, a water discharging ring, and a spring, wherein said structure is disposed in a main body of the faucet in conjunction with a plurality of washers; wherein said water admitting member is comprised of a water stopping edge, a through hole, a locating block, and a locating portion, said water admitting member being located in a bottom end of said housing such that said water stopping edge and said locating block of said water admitting member are joined with said water distributing block, and such that said through hole of said water admitting member is aligned with a center through hole of said water discharging ring.

2. The water controlling stem structure as defined in claim 1, wherein said locating portion of said water admitting member is positioned by an auxiliary locating member of said housing.

3. The water controlling stem structure as defined in claim 2, wherein said locating portion of said water admitting member is a protrusion.

4. The water controlling stem structure as defined in claim 2, wherein said locating portion of said water admitting member is a slot.

* * * * *